(12) United States Patent
Fuschi

(10) Patent No.: US 6,860,599 B2
(45) Date of Patent: Mar. 1, 2005

(54) MULTIPLE BIFOCAL OR TRIFOCAL LENS

(76) Inventor: Sergio Giacomo Fuschi, 1713 Foster Ave., Panama City, FL (US) 32405

( * ) Notice: Subject to any disclaimer, the term of this patent is extended or adjusted under 35 U.S.C. 154(b) by 0 days.

(21) Appl. No.: 10/458,337

(22) Filed: Jun. 10, 2003

(65) Prior Publication Data

US 2003/0231281 A1 Dec. 18, 2003

Related U.S. Application Data

(60) Provisional application No. 60/389,422, filed on Jun. 17, 2002.

(51) Int. Cl.7 ................................................ G02C 7/06
(52) U.S. Cl. ...................................... 351/168; 351/171
(58) Field of Search .............................. 351/159, 161, 351/164, 168–172, 177–78

(56) References Cited

U.S. PATENT DOCUMENTS

| | | | |
|---|---|---|---|
| 772,196 A | 10/1904 | Ward ............................ | 351/54 |
| 1,085,522 A | 1/1914 | Baker ........................... | 351/54 |
| 1,585,489 A | 5/1926 | Hailman ....................... | 351/84 |
| 2,053,551 A | 9/1936 | Culver et al. ................ | 351/168 |
| 2,390,825 A | 12/1945 | Carlisle ....................... | 351/107 |
| 3,033,359 A | 5/1962 | Mercer ........................ | 206/233 |
| 4,690,524 A | 9/1987 | Daniels et al. .............. | 351/168 |
| 5,024,517 A * | 6/1991 | Seidner ....................... | 351/161 |
| 5,349,396 A * | 9/1994 | Roffman et al. ............. | 351/161 |
| 5,790,226 A * | 8/1998 | Pollak .......................... | 351/54 |
| 6,019,470 A | 2/2000 | Mukaiyama et al. ........ | 351/177 |
| 6,027,214 A | 2/2000 | Graham ....................... | 351/57 |
| 6,030,077 A | 2/2000 | Sawano et al. ............. | 351/161 |
| 6,179,420 B1 | 1/2001 | Roffman et al. ............ | 351/161 |

\* cited by examiner

Primary Examiner—Jordon M. Schwartz
Assistant Examiner—Jessica Stultz
(74) Attorney, Agent, or Firm—Richard S. Vermut; Rogers Towers, P.A.

(57) ABSTRACT

The present invention allows the user to have custom-made lenses where the far-distance corrective segment is always located in the central region of the lens and allowing the user full range of left to right eye movement to view far-distanced objects at eye level. The present invention may have any-sized or shaped bifocal at the bottom of the lens and a trifocal atop, or vice versa, a bifocal at the bottom and a bifocal at the top, and/or a trifocal at the bottom and a trifocal at the top. The location, size and type of corrective lens may be adapted to the user's lifestyle and for maximizing the far-distance correction segment area.

17 Claims, 1 Drawing Sheet

MULTIPLE BIFOCAL OR TRIFOCAL LENS

This application claims the benefit of provisional application Ser. No. 60/389,422 filed Jun. 17, 2002 by Sergio Giacomo Fuschi.

BACKGROUND OF THE INVENTION

This invention relates to a multifocal lens and eyeglasses having a vision correction assembly, montage, and/or arrangement which consists of two integrated bifocal or trifocal lens regions and a far-distance vision correction region.

In the ordinary use, arrangement, application and/or mounting of bifocal and trifocal lenses, the segments for near-vision and intermediate-distance correction are usually arranged in the lower portion of prescription lenses, thus requiring the wearer to raise his head or neck and direct his eyes to the lower part of the lens to view nearby or intermediately-distanced objects that are located or displayed at or higher than the user's eye level. For instance, in applications associated with carpenters', plumbers' or contractors' professions, it is usually desirable to look through the near-distance corrective segment of a bifocal or trifocal lens, or through the intermediate-distance corrective segment of a trifocal; but then it becomes necessary to cast the head back to focus on the object and position the eyes downward to gaze through the desired lens segment when something is at or above a user's eye level. A similarly strained position must be assumed to view a computer screen, at or above eye level, through the near or intermediate-distance correction and magnification range of a user's lens. The process is particularly arduous when a person seeks to read a document placed below eye level, for instance atop a desk, and alternatively to read on a screen, at or above eye level, what he may be typing on a computer.

To obviate the foregoing disadvantages, the construction of lenses adapted to be turned through auxiliary frames, in their bearings, via various types of swivel, locking, sliding and/or spring mechanisms and connections, and/or with each lens moving simultaneously or independently or towards a desired direction of focus have been proposed. See U.S. Pat Nos. 772,196; 1,085,522; and 2,390,825. Also the use of multiple lenses has been proposed. See U.S. Pat. No. 1,585,489. For applications in work locations with which a computer screen is associated, or for activities associated with cash registers, larger near-vision and variously-shaped near-distance correction segments have been proposed to increase near-distance correction and magnification. See U.S. Pat. No. 4,690,524. Further, detachable eyeglass frames with lenses specially placed and/or distanced from the eyeglass for specialized occupations have been proposed for purpose of accommodating sports, medical and other enumerated occupations similar to those subject of the present invention, with the simultaneous objects of: Utilizing a detachable intermediate-distance corrective lens atop any type of eyeglass, including bifocals and trifocals; to provide a full field of view for any correction, for users who cannot adapt to wearing bifocal or trifocal lenses constantly; and to avoid the diminishment of the field of view for any correction. See U.S. Pat. No. 6,027,214. Additionally, where bifocal or trifocal lenses are not desirable, disposable lens shields and "press-on" lenses in the upper and/or upper-central regions of the lens have been proposed. See U.S. Pat. No. 3,033,359; PCT Int'l App. PCT/US 94/14271.

BRIEF SUMMARY OF THE INVENTION

Swivel, locking, sliding, turning, and/or spring mechanisms and auxiliary frames become loose over time resulting in a failure to hold the lenses in a fixed position. See e.g. U.S. Pat Nos. 772,196; 1,085,522; 1,585,489; and 2,390,825. Such prior art requires the user to manually adjust the frames. In occupations requiring the user to have his hands free for other applications, this prior art is impracticable. Also, if the user's prescription lens also corrects for astigmatism the optical axes around which the lens' different values of optical power are set might be moved. The present invention allows a hands-free solution without compromise to users whose lenses correct for astigmatism. Compare U.S. Pat. Nos. 772,196; 1,085,522; 2,390,825; 3,033,359; PCT Int'l App. PCT/US 94/14271.

The enlargement of the near- and/or intermediate-distance segment of bifocals or trifocals still requires the user to tilt his head backward to view items located above eye level, such as pilots viewing instrument panels or plumbers generally. See e.g. U.S. Pat. No. 4,690,524. Computer screens are normally located at or slightly below the user's eye level. While, enlargement of the trifocal's intermediate correction segment might be useful for viewing such intermediately-distanced object, the user would have to direct his eyes through the upper portion of the lens to see afar. If the expanded bifocal/trifocal region did not reach the center of the lens, then the user would still have to move his neck, head and eyes back and downward somewhat to view an object at eye level. If the prior art were applied to enlarge the bifocal/trifocal corrective segments sufficiently so that they did occupy the central region of the lens, the users left to right range of view of far-distanced objects would be interrupted with the concomitant change in magnification. As a result, the suitability of such lenses for everyday wear would be reduced.

The detachable lens assembly described in U.S. Pat. No. 6,027,214 contemplates mounting a near-distance or intermediate-distance eyeglass assembly over the central, lower or upper region of the user's everyday glasses. The effect is to temporarily convert prescription or non-prescription eyeglasses into situational bifocals or trifocals. An alternative object is to provide increased magnification for surgery over the prescribed magnification levels. Another alternative embodiment of said prior invention is to mount the temporary bifocal or trifocal atop the upper or central regions of a user's bifocal or trifocal lenses, thereby temporarily converting the far-distance segment of the central and/or upper regions of his lens into near- or intermediate-distance corrective lens.

In contrast to the lens assembly described at U.S. Pat. No. 6,027,214, the present invention solves the risk of going down stairs as a person may look through the bottom or top of the lens via the intermediate distance portions of the lens to view oncoming, intermediately-located stairs. The present invention does not require the carrying or safe-storage of a second set of glasses or attachment thereto. Unlike the prior art which adds the additional weight of a frame and lens, the present invention adds minimal weight to the user's normally prescribed eyeglasses. This latter consideration is particularly important in comparing the suitability of prior art with the present invention, where the base lens is already heavy due to the user's requirement for significant magnification.

Another benefit of the present invention over that of the lens assembly described at U.S. Pat. No. 6,027,214, is that the present invention does not increase the magnification over that which is prescribed to attain normal visibility. As a result, the lens may be worn for daily and continually. Further, the present invention may be manufactured onto a single lens, thereby reducing the increased cost of manufacture and/or purchase. Both the present invention and the prior art described at U.S. Pat. No. 6,027,214 are impracticable to achieve intermediate-distance vision correction through the central region of the lens: The present invention, because the far-distance segment would always be located at the center of the lens. This seeming impracticability, however, allows the wearer smooth left to right eye movement in the far-distance vision range at eye level. Said prior art cannot be applied practicably in the case of a bifocal/ trifocal or far-distance vision corrective lenses because the weight added to overcome the far-distance segment at the center of the customary lens would be impracticable and too heavy for long-term use. Also, the prior art would not be practicable for extended or daily wear by users of bifocals and trifocals because their far-distance vision segment would be limited to the top part of the lens, requiring one to walk or drive while tilting the head down.

The present invention may have any-sized or shaped bifocal at the bottom of the lens and a trifocal atop, or vice versa, a bifocal at the bottom and a bifocal at the top, and/or a trifocal at the bottom and a trifocal at the top. The location, size and type of corrective lens may be adapted to the user's lifestyle and for maximizing the far-distance correction segment area. For instance, a trifocal lens wearer who worked with computers might find useful locating an intermediate segment at both the top and bottom regions of the lens; whereas a plumber might prefer to have the near-distance segment only, repeated twice on the lens, thereby opting for a regular or reduced-size bifocal at the top and a trifocal at the bottom.

The present invention allows the user to direct his vision towards nearby and intermediately-distanced objects located at or above eye level, without suffering the neck, muscle and/or eye strain associated with moving and/or maintaining for extended periods of time the head in a backwards-tilted position and the eyes directed to the lower part of the lens. Applications requiring near and intermediate-distance focus, such as those involving using a computer, normally require the user to maintain his head and neck tilted back and his eyes directed to the lower part of the lens for an extended period of time to look through the near-distance portion and/or intermediate-portion of the lens, when reading a paper atop a desk or the computer screen respectively. The location of the respective magnifications in the present invention, therefore, allows such a user to wear one set eyeglasses or lenses for all his daily activities. It is particularly useful compared to the prior art of detachable, temporary lenses for users of advanced age where the difference between a user's far and near distance vision is great because the concept of adding weight to the frame and nose bridge to overcome the existing magnification levels of the portion of the lens desired to be modified is not applicable in the present invention.

It is a first object of the present invention to provide a multifocal lens which may be used by the wearer to work on applications requiring near- and intermediate-distance focus such as those associated with the occupations involving cash registers, computers, carpentry, plumbing, contractor, electrical, technicians, and medicine, where the object focused upon is located at or above the user's eye level.

It is a second object of the present invention to provide a multifocal lens which may be used by the user to work on applications requiring the simultaneous focusing upon near and intermediate-distanced objects, such as viewing information on a nearby piece of paper atop a desk and viewing a computer monitor or screen located at or above eye level.

It is a third object of the present invention to provide a multifocal lens which will avoid strain caused by the user maintaining the head tilted back so his eyes may gaze through the near- or intermediate-distance segments located at the lower region of customary lenses.

It is a fourth object of the present invention to achieve the first three objectives without moving the axis around which bifocal or trifocal lenses may be set on account of astigmatism.

It is a fifth object of the present invention to achieve the first four objectives in one unitary lens, to reduce the cost of purchase and/or manufacture, to reduce the likelihood of damage or loss, and to avoid the inconvenience of carrying multiple eyeglasses.

It is the sixth object of the present invention to allow the user to wear a single set of lenses and/or eyeglasses which will best suit his daily lifestyle.

It is a seventh object of the present invention, to achieve the first six objects of the present invention through a single, lens without adding the weight of multiple, lenses, and without compromising the far-distance corrective segment's utility and location in multifocal lens eyeglasses.

BRIEF DECRIPTION OF THE SEVERAL VIEWS OF THE DRAWINGS

DETAILED DESCRIPTION OF THE INVENTION

Figure 1:
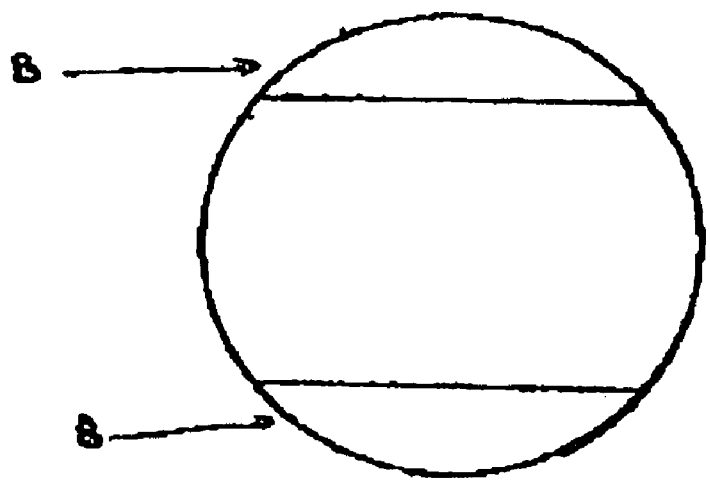
FIG. 1 illustrates a frontal view of the multifocal lens consisting of the bifocal lens segment (B) positioned at the top and lower portions of the lens.
Figure 2:
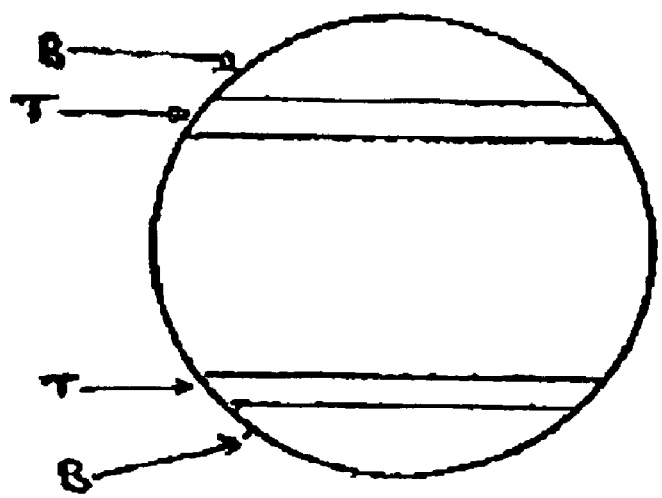
FIG. 2 illustrates a second frontal view of the multifocal lens consisting of the trifocal lens segment (T) positioned at the top and lower portions of the lens.
Figure 3:
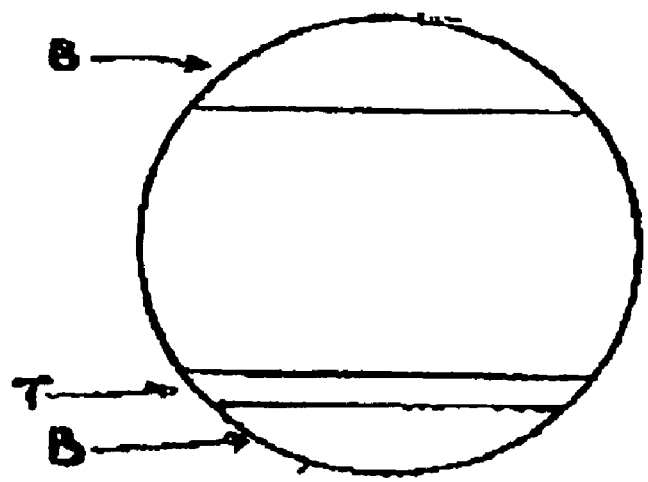
FIG. 3 illustrates a third frontal view of the multifocal lens consisting of a bifocal lens segment (B) at the top and a trifocal lens segment (T) at the bottom portion of the lens.

The above seven (7) objects of the present invention may be attained according to a first aspect of a multifocal lens which provides a bifocal lens segment located at the top region of the lens and a second bifocal lens segment located at the bottom region of the lens. A second aspect of the invention attains the foregoing objects of the invention by providing a multifocal lens with a trifocal lens segment located at the top region and a second trifocal lens segment located at the bottom region of the lens. A third aspect of the invention attains the foregoing objects of the invention by providing a multifocal lens with a trifocal lens at the lower region of the lens and a bifocal lens at the top region of the lens. A fourth aspect of the invention attains the foregoing objects of the invention by providing a multifocal lens with a trifocal lens segment located at the top region of the lens and a bifocal lens segment located at the bottom region of the lens. A fifth aspect of the invention attains the foregoing objects of the invention by providing a multifocal lens with varying sizes and shapes of the applicable bifocal and trifocal lens segments tailored to the user's daily requirements and to minimally compromise the far-distance vision corrective segment.

The first two aspects permit easy design and manufacture because a single blank may be employed to duplicate the prescribed bifocal or trifocal normally prescribed only for the bottom region of lenses. The third fourth and fifth aspects permit more space on the lens for placing the far-distance corrective lens.

In a first preferred embodiment, the multifocal lens is mounted on prescription glasses. In a second preferred embodiment, the multifocal lens is mounted on other prescription glasses, including but not limited to work glasses, safety glasses, goggles and decorative glasses.

I claim:

1. A multifocal lens and lens assembly in eyeglasses including a lens having far-distance magnification comprising:
   a first segment positioned at a top region of the lens;
   a second segment positioned at a bottom region of the lens, with the first and second segments each having different focal length values than the far-distance portion;
   a third segment, positioned in the top region of the lens; and
   a fourth segment, positioned in the bottom region of the lens with the third and fourth segments each having different magnification than the far-distance portion and the first and second segments.

2. The multifocal lens and lens assembly in eyeglasses of claim 1, wherein one of the third and fourth segments is arranged horizontally.

3. The multifocal lens and lens assembly in eyeglasses of claim 1, wherein the third and fourth segments are arranged horizontally.

4. The multifocal lens and lens assembly in eyeglasses of claim 1, wherein the magnifications of the first and second segments are the same.

5. The multifocal lens and lens assembly in eyeglasses of claim 1, wherein the magnifications of the first and second segments are not the same.

6. The multifocal lens and lens assembly in eyeglasses of claim 1, wherein the magnifications of the third and fourth segments are the same.

7. The multifocal lens and lens assembly in eyeglasses of claim 1, wherein the magnifications of the third and fourth segments are not the same.

8. The multifocal lens and lens assembly in eyeglasses of claim 1, wherein the third segment is located entirely in the top region of the lens.

9. The multifocal leas and lens assembly in eyeglasses of claim 1, wherein the fourth segment is located entirely in the bottom region of the lens.

10. The multifocal lens and lens assembly in eyeglasses of claim 8, wherein the fourth segment is located entirely in the bottom region of the lens.

11. A multifocal lens and lens assembly in eyeglasses including a lens having far-distance magnification comprising:
    a first segment positioned at a top region of the lens;
    a second segment positioned at a bottom region of the lens, with the first and second segments each having different focal length values than the far-distance portion;
    a third segment, positioned entirely in the top region or the bottom region of the lens, with the third segment having a different magnification than the far-distance portion.

12. The multifocal lens and lens assembly in eyeglasses of claim 11, wherein the third segment is arranged horizontally.

13. The multifocal lens and lens assembly in eyeglasses of claim 11, wherein the magnifications of the first and second segments are the same.

14. The multifocal lens and lens assembly in eyeglasses of claim 11, wherein the magnifications of the first and second segments are not the same.

15. The multifocal lens and lens assembly in eyeglasses of claim 11, wherein the magnification of the third segment is the same as the magnification of the first segment.

16. The multifocal lens and lens assembly in eyeglasses of claim 11, wherein the magnification of the third segment is the same as the magnification of the second segment.

17. The multifocal lens and lens assembly in eyeglasses of claim 11, wherein the magnification of the first, second and third segments are all different.

* * * * *